United States Patent [19]

Clark et al.

[11] Patent Number: 4,909,535
[45] Date of Patent: Mar. 20, 1990

[54] VEHICLE SUSPENSION SYSTEM, AND METHOD OF OPERATING SAME

[76] Inventors: Daniel C. Clark, 692 Olean Rd., East Aurora, N.Y. 14052; Kenneth D. Garnjost, 252 Rivermist Dr., Buffalo, N.Y. 14202

[21] Appl. No.: 331,669
[22] PCT Filed: Jan. 20, 1988
[86] PCT No.: PCT/US88/00133
§ 371 Date: Feb. 14, 1989
§ 102(e) Date: Feb. 14, 1989
[51] Int. Cl.$^4$ .................................. B60G 17/08
[52] U.S. Cl. ........................................ 280/707
[58] Field of Search ............... 280/661, 707, 709, 804, 280/6.1

[56] References Cited

U.S. PATENT DOCUMENTS

| | | | |
|---|---|---|---|
| 4,700,972 | 10/1987 | Young | 280/707 |
| 4,702,490 | 10/1987 | Yamaguchi et al. | 280/707 |
| 4,706,787 | 11/1987 | Wossner | 280/707 |
| 4,711,464 | 12/1987 | Bilas | 280/704 |

*Primary Examiner*—Richard A. Bertsch
*Attorney, Agent, or Firm*—Sommer, Oliverio & Sommer

[57] ABSTRACT

An "active" suspension system provides two parallel force-transmitting paths between the body and wheel of a vehicle. The first path has a main spring (41), and the second path includes an actuator (42) and a spring (43). LVDT's (53,55) are arranged to monitor the displacements of the actuator (42) and the spring (43). The actuator is arranged in a high-gain closed position or velocity servoloop. The actual force ($F_w$) exerted by the suspension system on the body is determined and compared with a desired force ($F_c$) to produce a force error signal ($F_e$). The force error signal ($F_e$) is converted to a command signal supplied to the servoloop. The servoloop operates the actuator (42) so as to continuously drive the force error signal ($F_e$) toward zero.

21 Claims, 2 Drawing Sheets

VEHICLE SUSPENSION SYSTEM, AND METHOD OF OPERATING SAME

TECHNICAL FIELD

The present invention relates generally to the field of suspension systems for use between a terrain-following member (e.g., a wheel, a ski, a hydrofoil, etc.) and body of a vehicle, and, more particularly, to an improved "active" suspension system and method of operating same.

Background Art

Conventional vehicle suspension systems typically have a shock absorber and a spring arranged in parallel with one another, and operatively interposed between the body and wheel of a vehicle. The shock absorber is normally a piston-and-cylinder arrangement in which fluid is caused to flow from one chamber to another through a restricted orifice. These systems are referred to as being "passive" in that they respond reactively to variations in the applied load. It is well known that such systems are designed to be a practical compromise between vehicle handling, on the one hand, and ride comfort, on the other.

In recent years, there has been increasing interest in the development of "active" suspensions as alternatives to such "passive" systems. In some of these "active" systems, the conventional shock absorber is replaced by a servoactuator, usually in the form of an electrohydraulic servovalve operatively arranged to control the flows of fluid with respect to the opposed chambers of a double-acting fluid-powered actuator. The actuator is basically a piston-and-cylinder arrangement, and is structurally similar to the familiar shock absorber. However, rather than merely control the flow of fluid from one chamber to the other through a restricted orifice, the orifice is omitted altogether and the flows to and from the opposing chambers are controlled by the servovalve. Thus, by operating the servovalve in response to various sensed parameters, the suspension system may be controlled "actively" to correct for disturbances. Examples of prior art "active" suspension systems are shown and described in U.S. Pat. Nos. 2,992,837, 3,029,089, 3,035,853, 3,124,368, 4,215,403 and 4,625,993, and in British Patent No. GB 2 003 255 B.

The advent of such "active" systems, largely made possible by the development of on-board microprocessors, has heralded a new age of vehicle suspensions. However, such "active" systems as have been developed heretofore have been characterized by a feeling of "harshness", as compared with conventional "passive" systems. One reason for this is that a fluid-powered actuator constitutes, at any point in time, a rigid link between the vehicle's wheel and body. Thus, if the roughness of the road surface generates high-frequency, low-amplitude vibrations, or "noise", which is beyond the frequency response to the servoactuator or below its friction threshold, this can be transmitted through the actuator to the body.

To alleviate such "harshness", others have proposed that a rubber isolator be placed in series with the actuator. (See, e.g., British Patent No. GB 2 003 255 B, issued June 23, 1982). If, as described therein, such an isolator has hybrid properties akin to those of both a pure spring and a damper, then the isolator would emphasize the transmission of higher-frequency vibrations from the wheel to the actuator, and thence to the body.

DISCLOSURE OF THE INVENTION

The present invention provides an improved vehicle suspension system, and an improved method of operating same. The suspension system is operatively arranged between a portion of a sprung mass (e.g., a vehicle body) and an unsprung mass, such as a terrain-following member (e.g., a wheel, a ski, a hydrofoil, and the like).

The improved suspension system broadly includes: a servoactuator arranged to act between the body and the terrain-following member. The actuator may act directly on the member and body portion, or may act indirectly thereon, as through an isolation spring. A high-gain servoloop is closed immediately about the servoactuator. A force command signal is supplied to indicate a desired force to be transmitted from the member to the body. The actual force exerted on the body portion is determined, either by direct measurement or calculation. A force error signal, reflective of the difference between the desired and actual forces, is developed. A command signal (i.e., either velocity or position) is supplied to the servoloop as a function of the force error signal. Hence, the actuator is urged to move so as to reduce the error between the desired and actual forces. If actuator velocity is controlled, the force error signal is simply multiplied by a constant gain to provide the velocity command signal to the servoloop. If actuator position is controlled, the position command signal supplied to the servoloop is preferably the sum of the force error signal multiplied by a first constant and the integral of the force error multiplied by a second constant.

In use, such improved system performs an improved method of operating such a vehicle suspension system, which method broadly includes the steps of: providing a high-gain closed servoloop immediately about the servoactuator; commanding a desired force to be transmitted from the terrain-engaging member to the body portion; determining the actual force transmitted from such member to such body portion; calculating the error between such desired and actual forces; and supplying a command signal to the servoloop about the actuator as a function of such calculated force error; thereby to urge the actuator to move to a position so as to reduce such force error.

Accordingly, the general object of the invention is to provide an improved vehicle suspension system.

Another object is to provide an improved method of operating a vehicle suspension system.

Another object is to provide an improved vehicle suspension system, and method of operating same, such that an actuator, which is arranged in a high-gain closed servoloop, will be urged to move so as to reduce the error between desired and actual forces.

Still another object is to provide an improved vehicle suspension system in which the transmission of high-frequency low-amplitude road "noise", and hence the resulting feeling of harshness, from the terrain-following member to the body, will be reduced.

These and other objects and advantages will become apparent from the foregoing and ongoing written specification, the drawings and the appended claims.

MODE(S) OF CARRYING OUT THE INVENTION

Figure 1:
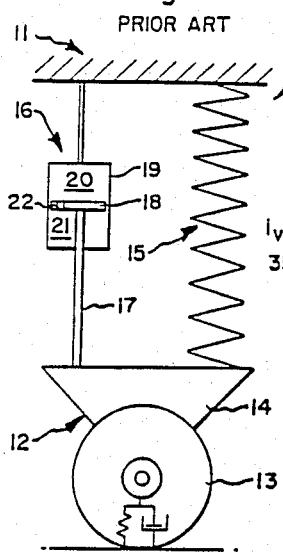
FIG. 1 is a schematic of a conventional "passive" vehicle suspension system, showing a spring and shock absorber arranged in parallel between a wheel and body.

At the outset, it should be clearly understood that like reference numerals are intended to identify the same structural elements, portions of surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

This invention provides an improved vehicle suspension system, and an improved method of operating same. In the following specification, several known suspensions, as well as the improved suspension, will be described in terms of motion of displacement of a single wheel relative to a proximate portion of the body of a vehicle. Persons skilled in this art will readily appreciate that similar suspensions would typically be provided between the body and each wheel. Thus, in the case of a four-wheeled vehicle, such as an automobile, there would typically be four such suspensions. However, it should be clearly understood that the invention is not limited to use with automobiles, or even land vehicles. Indeed, the invention may be used with trucks, construction equipment, track-laying vehicles, railway cars, aircraft, hydrofoils, and the like. Hence, as used herein, the term "vehicle" is intended in a broad generic sense, and it is foreseen that the invention may be used in many types of vehicles having diverse body shapes and configurations. Similarly, the term "terrain-following member" is intended to describe any type of member which generally follows the terrain or contour of a surface. Thus, examples of such members include, but are not limited to, road wheels, hydrofoils, skis, and the like. Moreover, the invention may be generally regarded as a force generating system operatively interposed between first and second members, and may be used in other-than-vehicular applications. However, in the following description, the invention will be described in terms of a conventional automobile.

Before describing the structure and operation of the improved suspension, however, it is deemed advisable to review the rudiments of several prior art suspensions.

PRIOR ART SUSPENSIONS (FIGS. 1-3)

Referring now to the drawings, and, more particularly, to FIG. 1 thereof, a conventional "passive" suspension system, generally indicated at 10, is shown as being provided between a portion of a body 11 and a wheel 12. The wheel is, in reality, an assembly which includes a tire 13 rotatably mounted on a support 14 (e.g., a control arm, an axle, or the like) which, in turn, is movable upwardly and downwardly relative to the body. However, in the following description, the assembly of the tire and wheel is referred to simply as a "wheel". Relative horizontal movements (e.g., either front-to-back, or side-to-side) between the wheel and body are otherwise restrained by suitable means (not shown).

The conventional suspension system typically includes a spring 15 (e.g., a coil spring, a leaf spring, etc.) and a shock absorber 16 arranged in parallel with one another to act between the wheel and body. The shock absorber has a piston 18 mounted for sealed sliding movement along a cylinder 19. As shown, the cylinder is connected to the body, and the piston is connected to the wheel via a rod 17. The chambers 20,21 above and below the piston, respectively, communicate with one another through a restricted orifice 22 provided through the piston. Forces exerted by the road on the wheel are transmitted through the spring and/or shock absorber, as appropriate, to the body. When the spring is compressively displaced, the force exerted by the wheel on the spring is transmitted to the body according to the equation $F=kx$, where F is force, k is the spring rate, and x is the magnitude of the spring compression. On the other hand, the shock absorber acts as a velocity damper. The shock absorber is capable of transmitting forces between the wheel and body only if there is relative velocity between the piston and cylinder. If there is no such relative velocity, as when the vehicle is at rest, the shock absorber will not transmit any force between the wheel and body, and the weight of the body will be supported solely by the spring. Thus, the shock absorber acts as a resistance to relative velocity. The greater the relative velocity, the greater the resistance. Hence, when the wheel moves upwardly relative to the body, as by the wheel hitting a bump, forces can be transmitted to the body through both the spring and the shock absorber. However, the total force transmitted to the body under such circumstances is not controlled. The amount of force transmitted by the spring would be proportional to its displacement, but the shock absorber may, at certain times, act as a rigid or semi-rigid force-transmitting link directly connecting the body and wheel.

Others have proposed to provide such conventional shock absorbers with selectively-variable flow orifices in order to afford the capability of altering the performance characteristics of the shock absorber. (See, e.g., U.S. Pat. Nos. 4,313,529 and 4,527,676).

In any event, the suspension system shown in FIG. 1 is regarded as "passive", regardless of whether the shock absorber has a fixed or variable orifice, in the sense that it responds passively to the variations in the applied load, and can only absorb energy. Because of the inherent limitations of such a "passive" system, and because the practical design thereof has been a compromise between desired ride quality and handling characteristics, others have been motivated to develop actively-controlled suspension systems.

Figure 2:
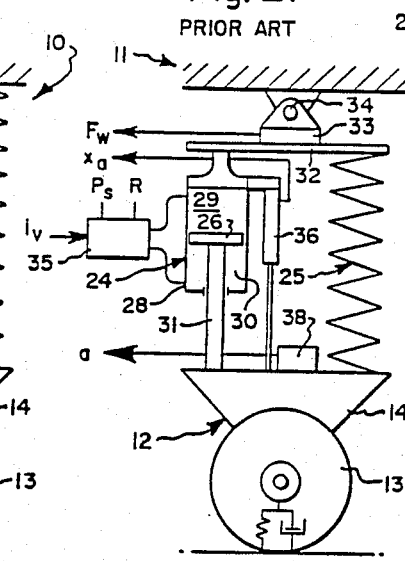
FIG. 2 is a schematic of a prior art "active" suspension system having an actuator and a spring arranged in parallel between a wheel and body.

FIG. 2 is a schematic of one such improved system, which is more fully disclosed in U.S. Pat. No. 4,625,993. This "active" system, generally indicated at 23, is shown as having a double-acting fluid-powered actuator 24 and a spring 25 arranged in parallel with one another, and acting between the wheel 12 and body 11. From a structural viewpoint, actuator 24 somewhat resembles shock absorber 16, except that restricted orifice 22 has been omitted. Thus, the actuator has a piston 26 slidably mounted in a cylinder 28, and separating upper and lower fluid chambers 29,30, respectively. Piston 26 is rigidly connected to wheel 12 by rod 31. The upper end of cylinder 28 is fixed to a bearing plate 32, which, in turn, is connected to the body via load cell 33 and pivotal connection 34. Spring 25 acts between bearing plate 32 and wheel 12. Fluid flow with respect to actuator chambers 29,30 is controlled by an electro-hydraulic servovalve 35. The servovalve selectively communicates chambers 29,30 with supply and return pressures, $P_s$,R, respectively, or vice versa, in response to the polarity and magnitude of an electrical command signal $i_v$. The length of the actuator is continuously monitored by a linear variable differential transformer (LVDT) 36, which is arranged to provide an electrical output signal $x_a$. Variations in the displacement of spring 25 may also be monitored in terms of variations in LVDT-supplied signal $x_a$. An accelerometer 38 is mounted on the wheel for movement therewith, and provides an electrical output signal a reflective of the vertical acceleration of the wheel. Load cell 33 is positioned between bearing plate 32 and the body, and is arranged to measure the total force exerted by spring and actuator on the body. The load cell is arranged to provide an electrical output signal $F_w$ reflective of such measured actual force.

The signals from the various sensors (i.e., the LVDT, the load cell, and the accelerometer), and certain other sensors provided elsewhere on the body, are supplied to a central control system (not shown), which selectively varies the command signal $i_v$ to operate the servovalve in the manner desired. Thus, for example, during braking, the actuators on the front wheels can be extended and/or the actuators on the rear wheels can be retracted, to prevent a "nose down" condition of the body, and so on. Thus, the central control system provides command signals to each servoactuator to achieve or maintain the particular body attitude desired.

While this system represents a significant advance and improvement over the conventional "passive" system, it is believed to be still possible for vehicle occupants to feel harshness, or high-frequency low-amplitude vibrations, below the friction threshold and/or above the bandwidth limitations of the servoactuator. Since, at any point in time, the wheel is connected directly to the body via the actuator, there is a direct conductive path for transmission of such harshness to the body.

Figure 3:
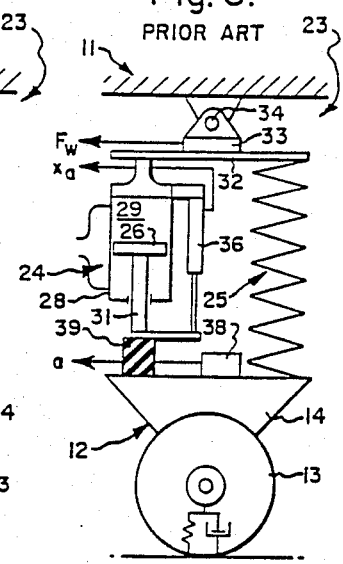
FIG. 3 is a schematic of another prior art "active" suspension system having an actuator and an isolator in series with one another, and arranged in parallel with a spring.

Referring now to FIG. 3, others have proposed to solve the problem of harshness by positioning a rubber isolator 39 in series with the actuator. The apparent intent of this solution was to allow for some limited wheel motion below the friction threshold of the actuator. However, such rubber isolators may have hybrid properties intermediate those of a pure spring and a pure damper. In other words, a rubber isolator may act both as a spring and as a damper. (See, e.g., British Patent No. 2 003 255 B, issued June 23, 1982). Thus, to the extent that it acts as a damper, the rubber isolator continues to provide a conductive path for transmission of such "noise" through the actuator, particularly at higher frequencies.

THE IMPROVED SUSPENSION SYSTEM (FIG. 4)

The present invention provides an improved "active" suspension system, and an improved method of operating same.

According to the present improvement, a high-gain position or velocity servoloop is closed immediately about the servoactuator. A signal, reflective of a desired amount of force to be exerted on the body, is provided as an electrical command. The actual force exerted on the body is determined, either by calculation or measurement, as desired. A negative feedback signal, reflective of such actual force, is summed with the command signal, and the difference therebetween is supplied as a force error signal. The force error signal is converted to either a position or velocity command signal (as desired), and is supplied to the actuator servoloop. Thus, the actuator is operated so as to drive the force error signal toward zero.

Figure 4:
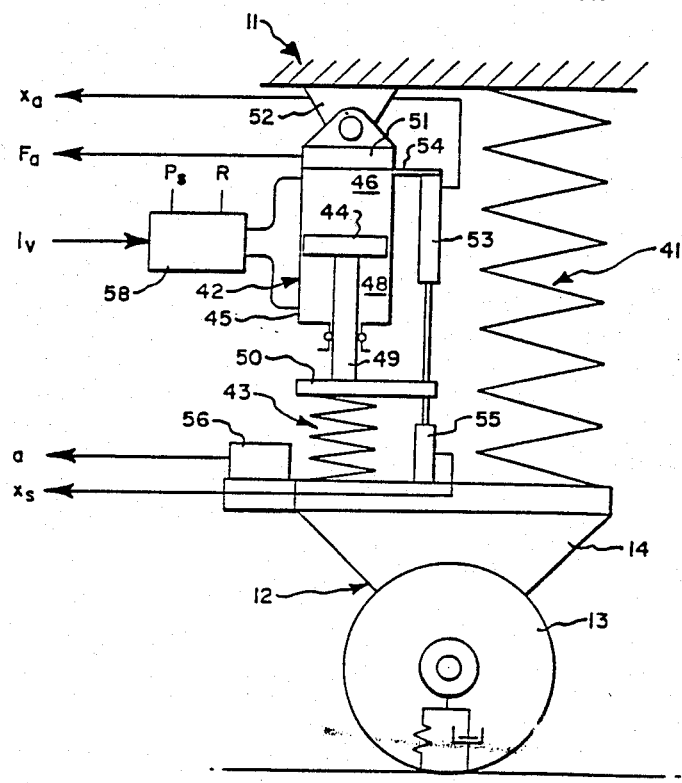
FIG. 4 is a schematic of one possible implementation of an improved "active" suspension system.

FIG. 4 illustrates one possible structural embodiment of the improved suspension system, which, for purposes of simplicity, is again illustrated as being operatively interposed between only one wheel 12 and a proximate portion of a vehicle body 11. Here again, persons skilled in this art will readily appreciate that such a system will typically be arranged between the body and each road wheel.

This form of the improved suspension system, generally indicated at 40, is shown as having a coil spring 41 arranged between the body and wheel. A double-acting fluid-powered actuator, generally indicated at 42, and another coil spring 43 are connected in series with one another, and are arranged to act between the body and wheel so as to be in parallel with spring 41. More particularly, actuator 42 is shown as having a piston 44 slidably mounted in a cylinder 45, and separating upper and lower fluid chambers 46,48, respectively. A rod 49 connects the piston to the upper dend of spring 43 through an intermediate vertically-movable plate 50. The lower end of spring 43 is arranged to act against wheel 12. The upper end of cylinder 45 is connected to the body through a load cell 51 and pivotal connection 52. Load cell 51 is arranged to provide an electrical signal $F_a$ reflective of the force exerted by the actuator on the body. The length of the actuator is continuously monitored by an LVDT 53, which is arranged to act between plate 50 and a member 54 extending laterally outwardly from the cylinder. This LVDT provides an electrical output signal $x_a$ reflective of the length of the actuator. Variations in signal $x_a$ therefore represent incremental displacements of the actuator. Another LVDT 55 is operatively arranged to act between plate 50 and wheel 12. This LVDT is arranged to provide an electrical output signal $x_s$ reflective of the distance between the plate and wheel, and, concomitantly, the length of spring 43. An accelerometer 56 is mounted on wheel 12, and provides an electrical signal a reflective of the vertical acceleration of the wheel. A four-way electrohydraulic servovalve 58 is connected to a fluid source (not shown) and sump (not shown) by connections labeled $P_s$ and R, respectively, and is arranged to selectively control the flow of fluid to or from, as appropriate, actuator chambers 46,48 in response to an electrical current $i_v$. Thus, depending on the polarity and magnitude of $i_v$, the actuator will move upwardly or downwardly from one position to another.

PRIOR ART CONTROL SYSTEM (FIG. 5)

Figure 5:
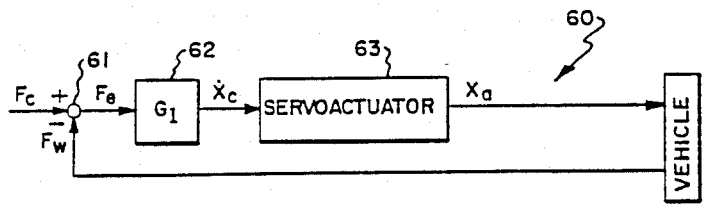
FIG. 5 is a simplified schematic block diagram showing, upon information and belief, a prior art control system for operating the suspension system shown in FIG. 2.

FIG. 5 is a simplified block diagram of a prior art control system, generally indicated at 60, used to operate the known suspension system shown in FIG. 2.

A force command signal $F_c$, reflective of the desired force to be exerted by the suspension system 23 on the body, was supplied as a positive input to summing point 61. This summing point also received, as a negative feedback, a signal $F_w$ supplied by load cell 33. Signal $F_w$ was reflective of the actual force exerted by the suspension on the vehicle body. Thus, summing point 61 was arranged to produce a force error signal $F_e$ reflective of the difference between the force command and feedback signals. The force error signal was multiplied by a gain $G_1$, indicated in block 62, to produce an actuator velocity command signal $x_c$, which was in turn supplied to a servoactuator 63. This servoactuator included actuator 24 and servovalve 35 operatively arranged to control the flows of fluid with respect to actuator chambers 29,30. Thus, the actuator rod 31 could be selectively extended or retracted, as desired, relative to cylinder 28. Hence, the magnitude of signal $x_c$ was reflective of the desired velocity of such relative movement between the rod and cylinder, while the polarity of this signal was reflective of the direction of such relative movement. In any event, the servoactuator would be operated to produce an actuator velocity, and its resulting position $x_a$. This actuator position is shown as being supplied to the vehicle.

Thus, the prior art control system 60 compared a supplied force command signal with a measured actual force signal to produce a force error signal. The force error signal was converted to a velocity command signal, and was supplied to the various feed-forward elements (not shown) of the servoactuator. However, upon information and belief, there was no closed-loop servocontrol of the servoactuator in response to the velocity command signal $x_c$.

THE IMPROVED CONTROL SYSTEM (FIGS. 6-8)

Figure 6:
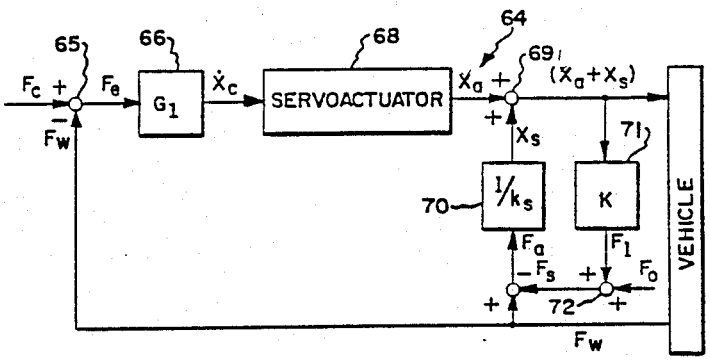
FIG. 6 is a schematic block diagram of an improved control system for operating the improved suspension shown in FIG. 4.
Figure 7:
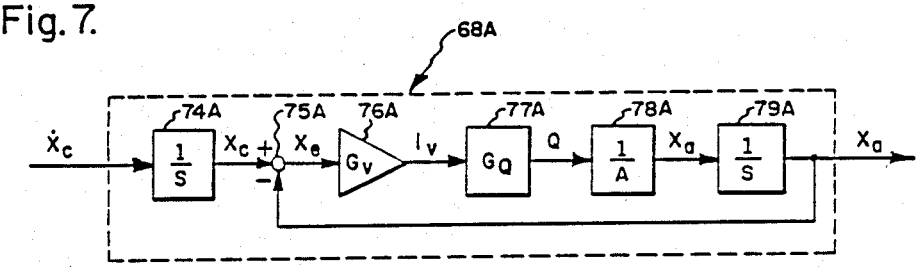
FIG. 7 is a block diagram of the servoactuator shown in FIG. 6, showing a position feedback servoloop.
Figure 8:
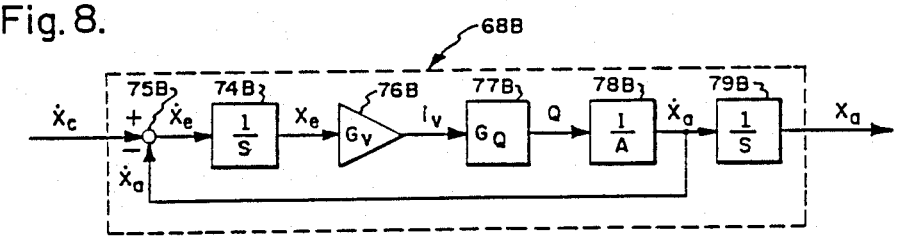
FIG. 8 is a block diagram of the servoactuator shown in FIG. 6, showing velocity feedback servoloop.

FIG. 6 is a schematic block diagram of an improved control system, generally indicated at 64, for operating a suspension system, such as that shown in FIG. 4. FIGS. 7 and 8 are block diagrams of alternative closed-loop servoactuators, which may be used in the control system of FIG. 6.

FIG. 6 shows, in block diagram form, the physical equations relating the actuator position, the series spring deflection, the parallel spring deflection, and the forces associated with each. This diagram shows that a feedback signal, proportional to the total suspension force $F_w$, could readily be derived from the measured actuator and series spring displacements. In the suspension system shown in FIG. 4, LVDT 55 is arranged to provide a signal $x_s$ reflective of the length of isolator spring 43, LVDT 53 is arranged to provide a signal $x_a$ reflective of the length of actuator 42, and load cell 51 is arranged to provide a signal $F_a$ reflective of the force exerted by the actuator on the body. However, the actual force $F_w$ exerted on the body is the sum of the force exerted by the actuator $F_a$ and the force $F_s$ exerted by spring 41. Or, $F_w = F_a + F_s$. At the same time, the force exerted by the actuator, $F_a$, is equal to the spring rate $k_s$ of the isolation spring 43 multiplied by the compressive displacement $x_s$. Thus, $F_a = k_s x_s$. On the other hand, spring 41 has a spring rate K. It will also be apparent that the incremental signals $x_a$ and $x_s$ reflect the incremental displacement of spring 41. From this, the actual force can be calculated.

In FIG. 6, a force command signal $F_c$, reflective of the desired total force to be exerted by suspension 40 on the proximate portion of the body, is shown as being supplied as a positive input to a summing point 65, which also receives an actual force signal $F_w$ as a negative input. These two signals are algebraically summed to provide a force error signal $F_e$. The force error signal is then multiplied by a gain $G_1$, shown in block 66, to produce a velocity command signal $x_c$ to servoactuator 68. Servoactuator 68 is not the same as servoactuator 63 in FIG. 5. As described infra, servoactuator 68 has a closed position or velocity feedback loop, which was not present in servoactuator 63. The velocity command signal $x_c$ causes relative velocity between rod 49 and cylinder 45, the magnitude and direction of such relative velocity ideally being proportional to the magnitude and polarity of signal $x_c$. Actuator velocity naturally integrates to produce an actuator position $x_a$.

FIGS. 7 and 8 are block diagrams of alternative forms of the servoactuator 68 shown in the improved control system. Thus, the servoactuator is enclosed within a dashed line indicated as 68A in FIG. 7, and indicated as 68B in FIG. 8. Either form, 68A or 68B, may be used as servoactuator 68 in FIG. 6. Servoactuator 68A (shown in FIG. 7) has a closed position feedback loop, whereas servoactuator 68B (shown in FIG. 8) has a closed velocity feedback loop.

FIG. 7 illustrates one form of the servoactuator, which is provided with a closed position servoloop. Thus, in this form, the velocity command signal $x_c$ is first integrated, as indicated by function 1/s in block 74A, to provide a position command signal $x_c$. Signal $x_c$ is supplied as a positive input to summing point 75A, which also receives a negative position feedback signal $x_a$. Thus, summing point 75A produces a position error signal $x_e$. Signal $x_e$, when multiplied by the valve gain $G_v$, indicated in block 76A, produces a current $i_v$ which is supplied to the torque motor of the servovalve. The servovalve may, for example, be of the type disclosed in U.S. Pat. No. 3,023,782, the aggregate disclosure of which is hereby incorporated by reference. Such current, when multiplied by the flow gain $G_Q$, indicated in block 77A, will produce a flow Q with respect to at least one of the actuator chambers. This flow, when divided by the area of the piston facing into such chamber, represented by function 1/A in block 78A, produces an actuator velocity $x_a$ which naturally integrates, as indicated by function 1/s in block 79A, to produce actuator position $x_a$. Signal $x_a$ is supplied as the negative feedback signal to summing point 75A. As persons skilled in this will readily appreciate, the transfer function in block 74A could also include a term directly proportional to the velocity command, to improve the instantaneous response to a force command.

FIG. 8 shows an alternative form of the servoactuator which is provided with a closed velocity servoloop. It can be derived from the form shown in FIG. 7 by straightforward block diagram algebra manipulation, whereby the feedback summing point is brought ahead of the integrator 74A to produce a velocity error $x_e$, and the feedback is similarly taken from ahead of the actuator velocity integration shown in block 79B. The result is an actuator with velocity feedback compared to a velocity command, and having an integration in the forward portion of the loop. Those skilled in the servomechanism art will recognize this forward loop integration of velocity error as common practice, and will also appreciate that block 74B could also include a term proportional to the velocity error, to improve the instantaneous response.

Thus, the improved suspension and control system provides several advantages over prior art systems. First, the provision of isolation spring 43 effectively decouples the actuator from the inertia of the wheel. This allows the velocity or position inner loop to have a high gain. Were it not for this decoupling, the combined inertia of the wheel and actuator would limit the gain in such inner loops. Hence, it is now possible to have high gain within the inner loop, which, in turn, allows the gain in the outer force loop to be increased. Closing either of the described position or velocity control loops around the actuator has the advantage of causing the actual actuator velocity to be more ideally proportional to the force loop error, independent of actuator loading or friction. Secondly, the isolation spring allows the wheel to move so as to follow terrain roughness, at frequencies at which the actuator is essentially rigid, without imparting such motions directly to the body.

Therefore, the invention provides an improved suspension system, and method of operating same. The improved suspension system is adapted to be operatively interposed between a terrain-following member and body, and may include an actuator and a spring arranged in series with one another between the wheel and body. The servoactuator is arranged in a high-gain closed position or velocity servoloop. The servoactuator may include an electrohydraulic servovalve and a fluid-powered actuator, a motor and a control system therefor, or some other automatically-operated mechanism. A force error signal is used to produce a position or velocity command signal to the servoloop, as appropriate, and the actuator is urged to move so as to drive the force error signal toward zero.

In user, the invention also provides an improved method of operating an active suspension system, which may include such a series-connected actuator and spring, and wherein a high-gain servoloop (i.e., either position or velocity) is closed immediately around the servoactuator. The improved method broadly includes the steps of commanding a desired force to be exerted on the body, determining the actual force exerted on the body, calculating a force error, and supplying a command signal to the servoloop as a function of the force error signal. If a velocity servoloop is employed, the force error signal may be multiplied by a constant gain to provide the velocity command signal to the servoloop. If a position servoloop is employed, the force error signal is multiplied by the sum of a first constant and the integral of a second constant, to provide the position command signal to the servoloop.

The term "high-gain", as used herein, can be broadly defined as being that gain which will cause the dynamic response of the closed loop to be such that the first-order break frequency (45° phase point) will be equal to or greater than the natural resonant frequency of the terrain-engaging member vibrating on the combined effective spring of the active suspension.

MODIFICATIONS

The present invention contemplates that many changes and modifications may be made.

For example, spring 41 can, in theory, be eliminated altogether, and series-connected actuator 42 and spring 43 may constitute the sole force-transmitting mechanism between the wheel and body. Spring 43 may be made of a suitable metal, such as steel, or may be made of a resilient material, such as a glass composite, rubber or plastic, and need not necessarily be in the form of a conventional spring. Preferably such resilient material would have low internal damping losses. Similarly, the actuator may be fluid-powered (either hydraulic or pneumatic), or may be electromagnetic, or utilize some other power medium.

The various actual forces may be measured directly (i.e., as by the use of a load cell) or calculated, as desired. Other types of position transducers may be substituted for the LVDT's shown. The positions of actuator 42 and spring 43 may be reversed relative to the body and wheel, if desired.

Therefore, while the preferred form of the improved suspension system, and control system therefor, has been shown and described, and several modifications thereof discussed, persons skilled in this art will readily appreciate that various additional changes and modifications may be made without departing from the spirit of the invention, as defined and differentiated by the following claims.

We claim:

1. In a vehicle suspension system operatively arranged between a portion of a body and a terrain-following member, the improvement which comprises:
   a servoactuator arranged to act between said body portion and said member;
   a high-gain servoloop closed immediately about said servoactuator;
   means for determining an error between a desired force to be transmitted from said member to said body portion and the actual force transmitted from said member to said body portion; and
   conversion means for supplying a command signal to said servoloop as a function of such force error;
   whereby said servoactuator will be operated so as to drive said force error toward zero.

2. The improvement as set forth in claim 1 wherein said servoloop controls the velocity of said servoactuator.

3. The improvement as set forth in claim 2 wherein said conversion means has a constant gain.

4. The improvement as set forth in claim 1 wherein said servoloop controls the position of said servoactuator.

5. The improvement as set forth in claim 4 wherein said conversion means is arranged to supply to said servoloop a rate of change of command signal proportional to said force error.

6. The improvement as set forth in claim 1, and further comprising:

a first spring arranged in series with said servoactuator and arranged to act between said member and body portion.

7. The improvement as set forth in claim 6, and further comprising:

first spring measuring means for determining the displacement of said first spring.

8. The improvement as set forth in claim 7, and further comprising:

actuator measuring means for determining the displacement of said servoactuator.

9. The improvement as set forth in claim 8, and further comprising:

a second spring arranged in parallel with said first spring and servoactuator and arranged to act between said member and body portion.

10. The improvement as set forth in claim 9 wherein the displacement of said second spring is proportional to the sum of the displacements of said first spring and actuator.

11. The improvement as set forth in claim 1, and further comprising:

a spring arranged in parallel with said actuator to act between said member and body portion.

12. The improvement as set forth in claim 11, and further comprising:

actuator measuring means for determining the displacement of said actuator, and another measuring means for determining the displacement of said spring.

13. The improvement as set forth in claim 1 wherein said servoactuator includes a fluid-powered actuator arranged to act between said member and body portion, and an electrohydraulic servovalve arranged to control a flow of fluid with respect to said actuator.

14. The method of controlling the operation of a vehicle suspension system having a servoactuator operatively arranged to act between a portion of a body and a terrain-following member, which method comprises the steps of:

providing a high-gain closed servoloop immediately about said servoactuator;

determining an error between a desired force to be transmitted from said member to said body portion and the actual force transmitted from said member to said body portion; and supplying a command signal to said servoloop as a function of such force error;

thereby to operated said servoactuator so as to urge said force error toward zero.

15. The method as set forth in claim 14 wherein said servoloop command signal is the product of a constant and said force error.

16. The method as set forth in claim 14 wherein said servoloop controls the position of said servoactuator.

17. The method as set forth in claim 16 wherein said servoloop command signal has a rate of change proportional to said force error.

18. The method as set forth in claim 17 wherein said command signal is the sum of a first constant multiplied by said force error and a second constant multiplied by the integral of said force error.

19. In a force generating system operatively arranged between a first member and a second member, the improvement which comprises:

a servoactuator arranged to act between said members;

a high-gain servoloop closed immediately about said servoactuator;

means for determining an error between a desired force to be transmitted from said first member to said second member and the actual force transmitted from said first member to said second member, and conversion means for supplying a command signal to said servoloop as a function of such force error;

whereby said servoactuator will be operated so as to drive said force error toward zero.

20. The improvement as set forth in claim 19, and further comprising:

a first spring arranged in series with said servoactuator and arranged to act between said members.

21. The method of controlling the operation of a force generating system having a servoactuator operatively arranged to act between a first member and a second member, which method comprises the steps of:

providing a high-gain closed servoloop immediately about said servoactuator;

determining an error between a desired force to be transmitted from said first member to said second member and the actual force transmitted from said first member to said second member; and supply a command signal to said servoloop as a function of such force error;

thereby to operate said servoactuator so as to urge said force error toward zero.

* * * * *